No. 687,961. Patented Dec. 3, 1901.
T. J. HUBBELL.
CLOD CRUSHER.
(Application filed May 22, 1901.)
(No Model.)

Witnesses, Inventor,
E. S. Brandau Thomas J. Hubbell
By Dewey Strong & Co.
Atty

UNITED STATES PATENT OFFICE.

THOMAS J. HUBBELL, OF WATSONVILLE, CALIFORNIA, ASSIGNOR TO DRUSILLA HUBBELL AND WM. H. AMES, OF WATSONVILLE, CALIFORNIA.

CLOD-CRUSHER.

SPECIFICATION forming part of Letters Patent No. 687,961, dated December 3, 1901.

Application filed May 22, 1901. Serial No. 61,356. (No model.)

*To all whom it may concern:*

Be it known that I, THOMAS J. HUBBELL, a citizen of the United States, residing at Watsonville, county of Santa Cruz, State of California, have invented an Improvement in Clod-Crushers; and I hereby declare the following to be a full, clear, and exact description of the same.

My invention relates to an apparatus for crushing and pulverizing clods and preparing the ground for seeding and other purposes.

It consists of a frame with means for drawing or propelling it over the ground, a series of boards or plates pivoted transversely across the frame and turnable therein, one or more of said plates having knives or cutters projecting downwardly and backwardly therefrom and others having cultivator-teeth similarly projecting, and a final plate without teeth carrying a seat and adapted to smooth the surface of the ground.

It also comprises means for adjusting the plates and the teeth and details of construction, all of which will be more fully explained by reference to the accompanying drawings, in which—

Figure 1:
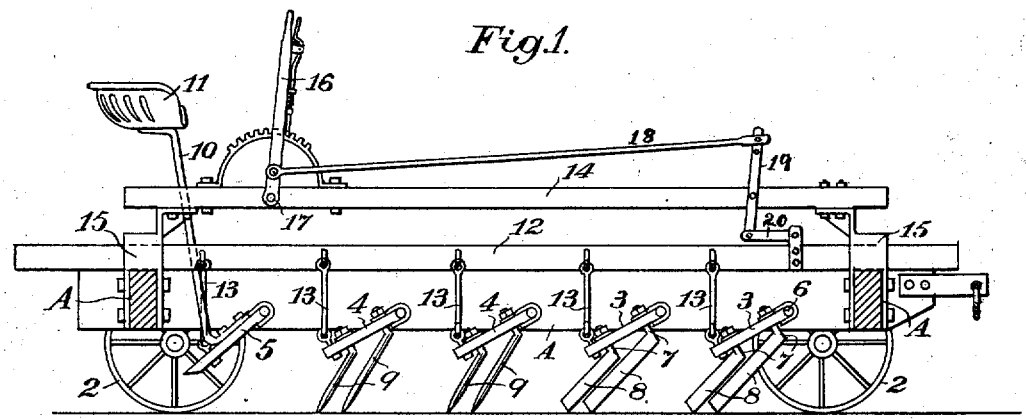
Figure 2:
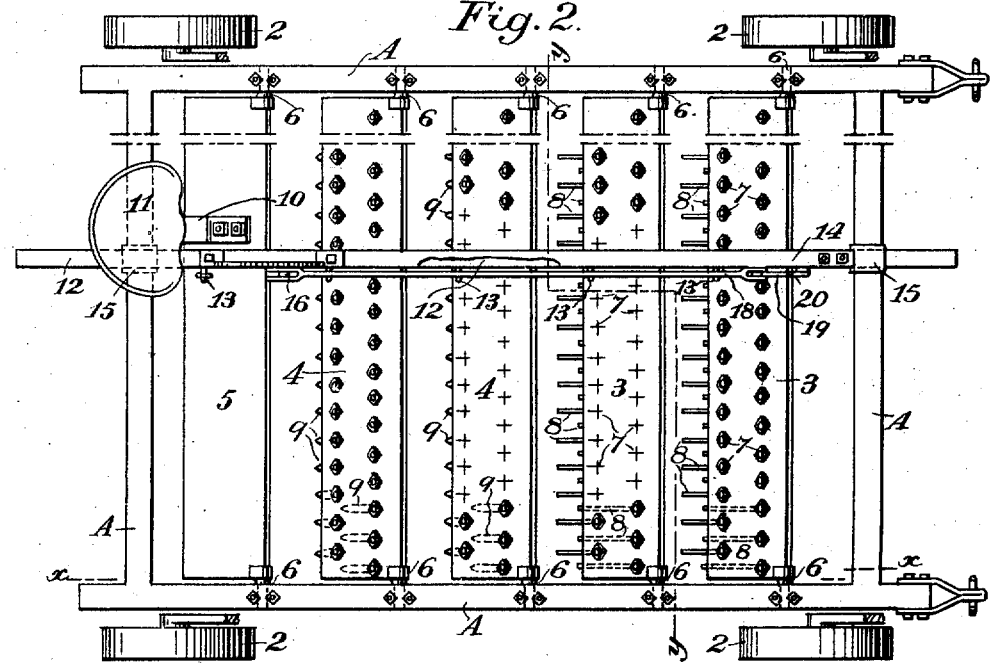
Figure 3:
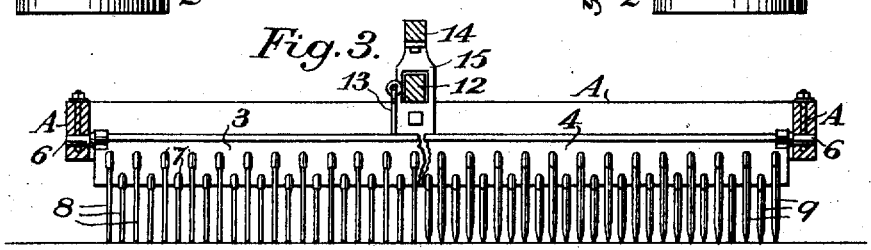

Figure 1 is a part section and longitudinal elevation on line $x\ x$. Fig. 2 is a plan of my invention. Fig. 3 is a part transverse section and elevation on line $y\ y$ of Fig. 2.

A is a framework of any suitable or desired size, which is preferably mounted upon bearing-wheels, as 2. The framework is made rectangular in shape, and extending across between the sides are plates or bars 3, 4, and 5. These plates have pivot or journal pins at the front upper edges, as at 6, and these pins extend into suitable holes or bearings in the side timbers of the main frame, so that the rear edges of the plates may swing about these pivots. Through the front plate 3 extend the shanks 7 of the inclined cutting-blades 8. These blades are inclined rearwardly from the shanks and the latter pass through holes in the plate 3, these holes being so arranged that the rear row of cutters will travel intermediate of the front row. The cutters are preferably arranged about two or two and one-half inches apart, and when the apparatus is drawn over the ground these cutting-blades will slice up and pulverize all hard lumps of earth and prepare the ground for the action of the next row or rows of pulverizing devices. These consist of cultivator-teeth 9, which are supported from one or more of the hinged plates 4 and project downwardly and backwardly in a similar manner to that described for the knives or cutters 8. There may be one or more plates carrying the knives and one or more plates carrying the teeth 9, there being a sufficient number of each to thoroughly pulverize and break up the ground.

5 is a final plate pivoted at is front, as previously described, and the rear edge is rounded or smooth, so that it will ride over the surface of the ground and act as a leveler and finish the work previously done.

I have here shown a seat-standard 10 fixed to this plate and carrying the seat 11, upon which the driver and operator sits, his weight serving to keep the rear edge of the plate down and dragging over the surface of the ground.

In order to lift the plates and with them the teeth or cutters out of the ground, I have shown a bar 12, slidable in guides upon the top of the main frame and connected by links 13 with the rear portions of each of the plates 3 and 4. 14 is another bar supported by suitable standards 15 above the main frame and above the bar 12. A lever 16 is fulcrumed to the bar 14 and connected, as at 18, 19, and 20, to the bar 12. This lever is within easy reach of the driver or operator sitting on the seat 11, and when it is desired to raise the plates with the teeth and cutters it is only necessary to move the lever so as to slide the bar 12, which will thus act through the links 13 to raise the rear ends of the plates, and thus turn them sufficiently to lift the knives and teeth out of the ground. The depth to which these teeth travel may be regulated in the same manner, and the wheels 2 may, if desired, be mounted upon crank-axles operated by levers in the usual manner for gang-plows and the like, so that the frame can be raised or depressed to cultivate the ground more or less deeply when at work and for the purpose of entirely raising the teeth out of the ground when the machine is to be transported to some other point.

I have here described one method by which the operation can be carried out; but it will be manifest that various modifications can be employed without materially altering the character and operation of the apparatus.

Having thus described my invention, what I claim as new, and desire to secure by Letters Patent, is—

1. A clod crushing and pulverizing apparatus consisting of a frame, plates extending transversely between the side bars thereof and having pivots upon their front ends about which they are turnable, shanks fixed near the front and rear edges of the plate respectively and having inclined cutting-blades extending downwardly and backwardly therefrom, the blades in the rear row being so disposed as to intersect the line of travel of those in the front row.

2. A device for crushing and pulverizing clods and the like, consisting of a rectangular frame, plates extending transversely between the sides and having pivots at the front about which they are turnable, shanks extending through the front plate having the double row of backwardly-inclined cutting-blades projecting downwardly therefrom, teeth projecting downwardly and backwardly from the rearmost and similarly arranged to follow the cutting-blades.

3. A device for crushing and pulverizing clods and the like, consisting of a rectangular frame, a series of transversely-disposed plates having their front edges pivoted to the frame, cutting-blades and teeth extending downwardly and rearwardly from the front and following plates respectively, a supplemental plane-surfaced plate similarly pivoted to the frame with its rear edge adapted to drag over the surface of the ground, and a seat supported from said plate.

4. An apparatus for crushing and pulverizing clods and the like, consisting of a rectangular frame, a series of transversely-disposed plates having their front edges pivoted in the frame, cutting-blades and teeth projecting downwardly and rearwardly from the front and following plates respectively, and a final smooth-surfaced seat-supporting plate, means for turning the plates consisting of a longitudinally-slidable bar with links connecting it with the rear edges of each of the plates and a lever by which it is movable.

5. A device for crushing and pulverizing clods and the like consisting of a frame, transversely-disposed plates having knives and teeth projecting downwardly and backwardly therefrom, a longitudinally-slidable bar, and links connecting it with the rear edges of the plates, a second bar supported above the slidable one, a lever fulcrumed to said bar and connected with the slidable one whereby the latter may be moved to raise or lower the plates and their appurtenances with relation to the surface of the ground.

In witness whereof I have hereunto set my hand.

THOMAS J. HUBBELL.

Witnesses:
S. H. NOURSE,
H. A. HYDE.